United States Patent
Tyagi et al.

(10) Patent No.: US 11,415,670 B2
(45) Date of Patent: Aug. 16, 2022

(54) OBJECT CLASSIFICATION USING LOW-LEVEL RADAR DATA

(71) Applicant: Aptiv Technologies Limited, St. Michael (BB)

(72) Inventors: Kanishka Tyagi, Agoura Hills, CA (US); John Kirkwood, Playa del Rey, CA (US)

(73) Assignee: Aptiv Technologies Limited, St. Michael (BB)

( * ) Notice: Subject to any disclaimer, the term of this patent is extended or adjusted under 35 U.S.C. 154(b) by 329 days.

(21) Appl. No.: 16/825,186

(22) Filed: Mar. 20, 2020

(65) Prior Publication Data

US 2021/0293927 A1 Sep. 23, 2021

(51) Int. Cl.
*G01S 7/41* (2006.01)
*G01S 13/72* (2006.01)
(Continued)

(52) U.S. Cl.
CPC .............. *G01S 7/412* (2013.01); *G01S 7/415* (2013.01); *G01S 13/52* (2013.01); *G01S 13/58* (2013.01); *G01S 13/723* (2013.01); *G01S 13/931* (2013.01)

(58) Field of Classification Search
CPC .......... G01S 7/412; G01S 7/415; G01S 13/52; G01S 13/58; G01S 13/723; G01S 13/931; G01S 13/42; G01S 7/417; G01S 7/411
See application file for complete search history.

(56) References Cited

U.S. PATENT DOCUMENTS 7,652,617 B2    1/2010 Kurtz et al.
7,821,870 B2    10/2010 Ramakrishnan
(Continued)

FOREIGN PATENT DOCUMENTS

DE          10344299       4/2005
DE         102018203591    7/2019
(Continued)

OTHER PUBLICATIONS

"Extended European Search Report", EP Application No. 21153656.0, dated Jul. 6, 2021, 12 pages.
(Continued)

*Primary Examiner* — Donald H B Braswell
(74) *Attorney, Agent, or Firm* — Sawtooth Patent Group PLLC

(57) ABSTRACT

Techniques and apparatuses are described that implement object classification using low-level radar data. In particular, a radar system extracts features of a detected object based on low-level data. The radar system analyzes these features using machine learning to determine an object class associated with the detected object. By relying on low-level data, the radar system is able to extract additional information regarding the distribution of energy across range, range rate, azimuth, or elevation, which is not available in detection-level data. With the use of machine learning, the object can be classified quickly (e.g., within a single frame or observation), thereby enabling sufficient time for the autonomous-driving logic to initiate an appropriate action based on the object's class. Furthermore, this classification can be performed without the use of information from other sensors.

20 Claims, 7 Drawing Sheets

(51) Int. Cl.
*G01S 13/931* (2020.01)
*G01S 13/52* (2006.01)
*G01S 13/58* (2006.01)

(56) References Cited

U.S. PATENT DOCUMENTS

| | | |
|---|---|---|
| 7,924,212 B2 | 4/2011 | Benitez et al. |
| 8,682,821 B2 | 3/2014 | Benitez et al. |
| 2009/0096662 A1 | 4/2009 | Wang et al. |
| 2016/0245911 A1* | 8/2016 | Wang ................... G01S 7/2927 |
| 2018/0348343 A1 | 12/2018 | Achour et al. |
| 2019/0101634 A1* | 4/2019 | Baheti .................. G01S 13/449 |
| 2019/0137601 A1* | 5/2019 | Driscoll .................... G01S 7/03 |
| 2019/0204834 A1 | 7/2019 | Harrison |
| 2019/0318162 A1 | 10/2019 | Yan et al. |
| 2019/0331768 A1* | 10/2019 | Harrison ................. G01S 7/417 |
| 2020/0341114 A1* | 10/2020 | Acharya ............... G01S 13/723 |

FOREIGN PATENT DOCUMENTS

| | | |
|---|---|---|
| EP | 1915636 A1 | 4/2008 |
| EP | 3540457 | 9/2019 |

OTHER PUBLICATIONS

Tahmoush, et al., "Time-Integrated Range-Doppler Maps for Visualizing and Classifying Radar Data", May 2011, pp. 372-374.

\* cited by examiner

OBJECT CLASSIFICATION USING LOW-LEVEL RADAR DATA

BACKGROUND

Advances in autonomous driving can lead to the ubiquitous use of self-driving cars and autonomous robots in business and everyday life. Many autonomous-driving techniques rely on information provided by one or more sensors to visualize a surrounding environment. With this information, autonomous-driving logic can recognize the presence (or absence) of objects and their current positions and velocities. Even with this information, however, it can be challenging for the autonomous-driving logic to determine an appropriate action that provides a sufficient margin of safety for avoiding a collision.

The autonomous-driving logic can determine the appropriate action based on the type of object detected. The type of object can indicate to the autonomous-driving logic whether the behavior of the object is predictable or unpredictable, and whether the safety margin should be increased or decreased, to avoid a potential collision. In some instances, time available for determining the appropriate action can be short, and in that time, the sensors may fail to obtain sufficient observations of the object to determine its behavior and accurately predict future movements. It can be challenging for the sensors to quickly classify the object for autonomous-driving applications.

SUMMARY

Techniques and apparatuses are described that implement object classification using low-level radar data. In particular, a radar system, which is mounted to a moving platform, extracts features of a detected object based on low-level data. The radar system analyzes these features using machine learning to determine an object class associated with the detected object. By relying on low-level data, the radar system is able to extract additional information regarding the distribution of energy across range, range rate, azimuth, or elevation, which is not available in detection-level data. In particular, the low-level data enables the radar system to determine intensity-based features or geometric-based features of the object. With the use of machine learning, the object can be classified quickly (e.g., within a single frame or observation), thereby enabling sufficient time for the autonomous-driving logic to initiate an appropriate action based on the object's class. Furthermore, this classification can be performed without the use of information from other sensors. The radar system can also utilize the object's class to tailor parameters of its tracking module. This improves the ability of the radar system to maintain track or visibility of the object over time.

Aspects described below include a method performed by a radar system that is mounted to a mobile platform. The method includes transmitting and receiving a radar signal. The radar signal is reflected by at least one object. The method also includes generating, by multiple receive channels of the radar system, digital beat signals representing time-domain samples of the received radar signal. The method additionally includes generating low-level data based on the digital beat signals. The low-level data comprises amplitude information across one or more dimensions of range, range rate, azimuth, or elevation. The method further includes extracting one or more features associated with the at least one object from the amplitude information within the low-level data. Using machine learning, the method includes analyzing the one or more features to determine an object class that is associated with the at least one object.

Aspects described below also include a radar system comprising at least one antenna array, a transceiver, and a processor. The transceiver is coupled to the at least one antenna array. The processor is coupled to the transceiver. Using the antenna array, the transceiver transmits and receives a radar signal, which is reflected by at least one object. The transceiver also generates, using multiple receive channels, digital beat signals representing time-domain samples of the received radar signal. The processor generates low-level data based on the digital beat signals. The low-level data comprises amplitude information across one or more dimensions of range, range rate, azimuth, and elevation. The processor also extracts one or more features associated with the at least one object from the amplitude information within the low-level data. Using machine learning, the processor analyzes the one or more features to determine an object class that is associated with the at least one object.

Aspects described below also include a computer-readable storage media comprising computer-executable Instructions that, responsive to execution by a processor, implement an object detection module. The object detection module accepts low-level data, which comprises amplitude information across one or more dimensions of range, range rate, azimuth, and elevation. The amplitude information includes a distribution of reflected energy associated with at least one object. The object detection module extracts one or more features associated with the at least one object from the amplitude information within the low-level data. Using machine learning, the object detection module analyzes the one or more features to determine an object class that is associated with the at least one object.

Aspects described below also include a system with means for performing object classification using low-level data.

This summary is provided to introduce simplified concepts for performing object classification using low-level radar data, which are further described below in the Detailed Description and Drawings. For ease of description, the disclosure focuses on automotive radar systems; however, the techniques are not limited to automobiles. The techniques also apply to radars of other types of vehicles, systems, and moving platforms. This summary is not intended to identify essential features of the claimed subject matter, nor is it intended for use in determining the scope of the claimed subject matter.

BRIEF DESCRIPTION OF THE DRAWINGS

The details of one or more aspects of object classification using low-level data are described in this document with reference to the following figures. The same numbers are used throughout the drawings to reference like features and components.

DETAILED DESCRIPTION

Overview

Figure 1:
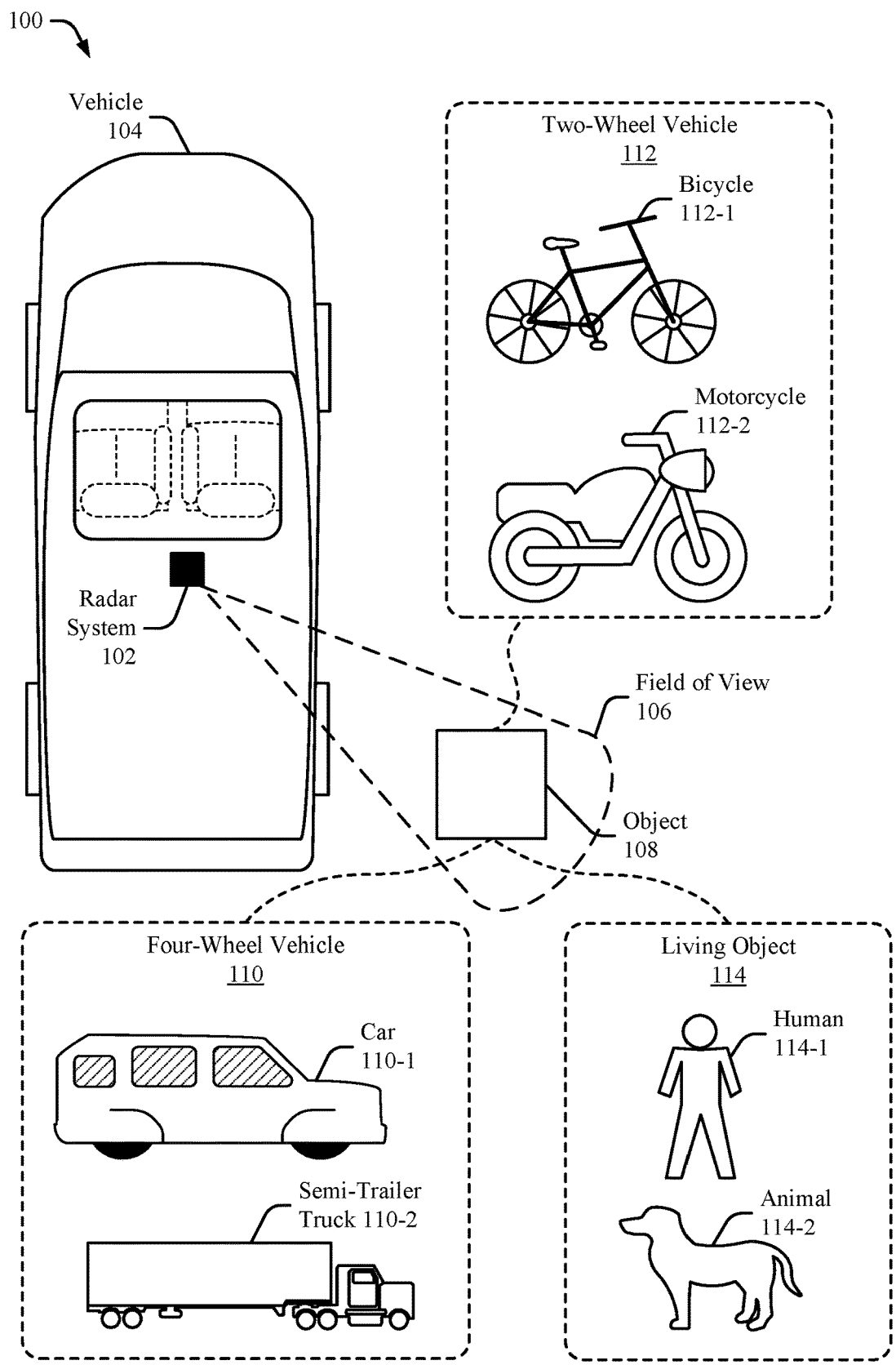
FIG. 1 illustrates an example environment in which a radar system capable of performing object classification using low-level data can be implemented.

Many autonomous-driving applications rely on information from sensors to visualize a surrounding environment, such as radar sensors. Relative to other types of sensors, like a camera, the radar can provide improved performance in the presence of different environmental conditions, such as low lighting and fog, or with moving or overlapping objects.

Some radars use detection-level data to analyze a behavior of an object over time. In particular, the radar can detect an object if one or more reflections of the object have an amplitude that is greater than a detection-level threshold, such as a constant-false-alarm-rate (CFAR) threshold. By using detection-level data, the radar can reduce the quantity of false detections (e.g., detections associated with noise or interference) and achieve a particular false-alarm rate. By analyzing the detection-level data, the radar can observe changes in a position or range rate of the detected object over time to classify the object. Unfortunately, detection-level data can be variable and is not always sufficient to distinguish between different types of objects. It can also be challenging for the radar to determine the correct classification of the object within the short time frame available for the autonomous-driving application to initiate a maneuver and avoid a potential collision with the detected object.

To address this, some techniques use sensor fusion to provide additional information for classifying the object. The use of additional sensors, however, can increase the cost, size, power consumption, and complexity of the autonomous-driving system. Consequently, this approach may be impractical for systems that place a premium on small size and low power consumption. Additionally, multiple observations of the object may still be necessary in order to correlate information across multiple sensors and classify the object. This delay may be too long to enable the autonomous-driving application to utilize object classification information in time to determine an appropriate maneuver to avoid a potential collision.

In contrast, this document describes techniques and devices that implement object classification using low-level radar data. In particular, a radar system, which is mounted to a moving platform, extracts features of a detected object based on low-level data. The radar system analyzes these features using machine learning to determine an object class associated with the detected object. By relying on low-level data, the radar system is able to extract additional information regarding the distribution of energy across range, range rate, azimuth, or elevation, which is not available in detection-level data. In particular, the low-level data enables the radar system to determine intensity-based features or geometric-based features of the object. With the use of machine learning, the object can be classified quickly (e.g., within a single frame or observation), thereby enabling sufficient time for the autonomous-driving logic to initiate an appropriate action based on the object's class. Furthermore, this classification can be performed without the use of information from other sensors. The radar system can also utilize the object's class to tailor parameters of its tracking module. This improves the ability of the radar system to maintain track or visibility of the object over time.

Example Environment

FIG. 1 is an illustration of an example environment 100 in which techniques using, and an apparatus including, a radar system 102 capable of performing object classification using low-level data may be embodied. In the depicted environment 100, the radar system 102 is mounted to, or integrated within, a vehicle 104. The radar system 102 is capable of detecting one or more objects 108 that are within proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow, or include, a trailer or other attachments. In general, the radar system 102 can be mounted to any type of moving platform, including moving machinery or robotic equipment.

In the depicted implementation, the radar system 102 is mounted on top of the vehicle 104 and provides a field of view 106 illuminating the object 108. In other implementations, the radar system 102 can be mounted to a front side, a backside, a left side, or a right side of the vehicle 104. In some cases, the vehicle 104 includes multiple radar systems 102, such as a first rear-mounted radar system 102 positioned near a left side of the vehicle 104 and a second rear-mounted radar system 102 positioned near a right side of the vehicle 104. In general, locations of the one or more radar systems 102 can be designed to provide a particular field of view 106 that encompasses a region of interest in which the object 108 may be present. Example fields of view 106 include a 360-degree field of view, one or more 180-degree fields of view, one or more 90-degree fields of view, and so forth, which can overlap (e.g., four 120-degree fields of view).

In general, the object 108 is composed of one or more materials that reflect radar signals. In some cases, the object 108 is a non-living object, such as a four-wheel vehicle 110 or a two-wheel vehicle 112. Example types of four-wheel vehicles 110 include a car 110-1 or a semi-trailer truck 110-2. A bicycle 112-1 and a motorcycle 112-2 represent different types of two-wheel vehicles 112. In other cases, the object 108 is a living object 114, such as a human 114-1 or an animal 114-2. The above objects 108 can be moving or stationary. Other types of objects not shown can include a continuous or discontinuous road barrier, a traffic cone, a concrete barrier, a guard rail, a fence, or a tree.

Information regarding the type of object that is detected by the radar system 102 can enable an autonomous-driving application of the vehicle 104 to determine an appropriate action to avoid a potential collision. Example actions can include braking to stop, veering, or reducing speed. In particular, the type of object can indicate whether the behavior of the object can be predictable or unpredictable, a minimum and maximum acceleration of which the object can change speeds, and whether the object is living or non-living. Based on this information, the autonomous-driving application can determine an appropriate safety margin (e.g., an appropriate distance and/or speed) to maintain while approaching the object 108 in order to reserve adequate time to avoid a potential collision.

As an example, an object class associated with the living objects 114 indicates that the object 108 can have unpredictable behavior. For example, a human 114-1 may suddenly stop in the middle of the street to pick something up or ignore traffic signs when in a rush to cross the street. To account for this unpredictable behavior, the autonomous-driving application can maintain a larger distance or a slower speed while approaching or passing the living object 114. In contrast, an object class associated with the four-wheel vehicles 110 can indicate that the object 108 can have a predictable behavior that follows the rules of the street. As such, the autonomous-driving application can maintain a shorter distance or a faster speed while approaching or passing the four-wheel vehicle 110. The radar system 102 and the vehicle 104 are further described with respect to FIG. 2.

Figure 2:
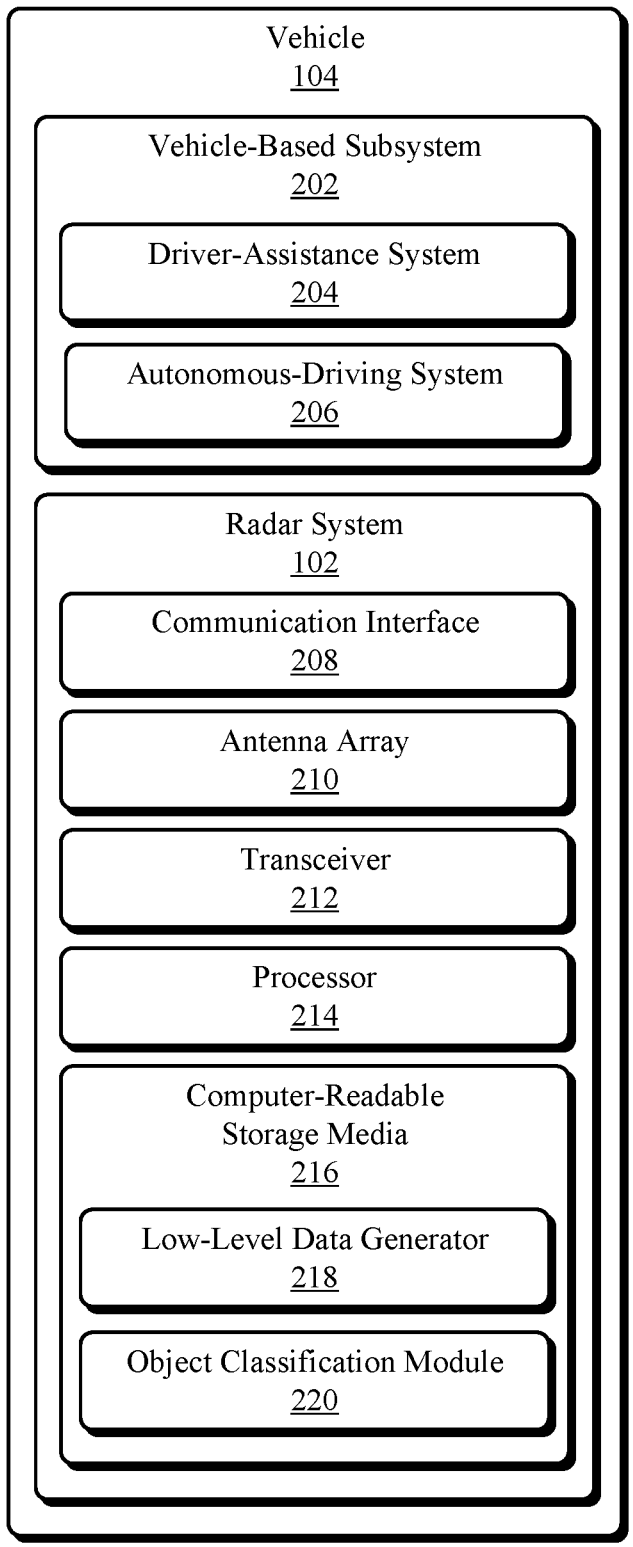
FIG. 2 illustrates an example implementation of a radar system as part of a vehicle.

FIG. 2 illustrates the radar system 102 as part of the vehicle 104. The vehicle 104 includes a vehicle-based system 202, such as a driver-assistance system 204 and/or an autonomous-driving system 206. Generally, the vehicle-based system 202 uses radar data provided by the radar system 102 to perform a function. The radar data can include information regarding a location and movement of a detected object 108, as well as classification data, which indicates an object class associated with the detected object 108. Example object classes can include a four-wheel vehicle class, a two-wheel vehicle class, or a living object class.

The driver-assistance system 204, for instance, provides blind-spot monitoring and generates an alert that indicates a potential collision with an object 108 that is detected by the radar system 102. In this case, the driver-assistance system 204 determines whether it is safe or unsafe to change lanes based on the radar data provided by the radar system 102. In some cases, this determination can be made based on the object class associated with the detected object 108.

As another example, the driver-assistance system 204 moves the vehicle 104 to a particular location while avoiding collisions with other objects 108 detected by the radar system 102. The radar data provided by the radar system 102 enables the autonomous-driving system 206 to perform an appropriate action to avoid a collision with the object 108. Such actions can include emergency braking, changing lanes, adjusting the vehicle 104's speed, or a combination thereof. In some cases, the type of action is determined based on the object class associated with the detected object 108.

The radar system 102 includes a communication interface 208 to transmit the radar data to the vehicle-based subsystem 202 or to another component of the vehicle 104 over a communication bus of the vehicle 104, for example, when the individual components shown in the radar system 102 are integrated within the vehicle 104. In general, the radar data provided by the communication interface 208 is in a format usable by the vehicle-based subsystem 202. In some implementations, the communication interface 208 may provide information to the radar system 102, such as the speed of the vehicle 104 or whether a turning blinker is on or off. The radar system 102 can use this information to appropriately configure itself. For example, the radar system 102 can determine an absolute speed of the object 108 by compensating for the speed of the vehicle 104. Alternatively, the radar system 102 can dynamically adjust the field of view 106 based on whether a right-turning blinker or a left-turning blinker is on.

The radar system 102 also includes at least one antenna array 210 and at least one transceiver 212 to transmit and receive radar signals. The antenna array 210 includes at least one transmit antenna element and at least one receive antenna element. In some situations, the antenna array 210 includes multiple transmit antenna elements and multiple receive antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

Using the antenna array 210, the radar system 102 can form beams that are steered or un-steered, and wide or narrow. The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds of narrow steered beams with digital beamforming. In this way, the radar system 102 can efficiently monitor an external environment and detect one or more objects 108 within a region of interest.

The transceiver 212 includes circuitry and logic for transmitting and receiving radar signals via the antenna array 210. Components of the transceiver 212 can include amplifiers, mixers, switches, analog-to-digital converters, or filters for conditioning the radar signals. The transceiver 212 also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver 212 can be configured to support continuous-wave or pulsed radar operations. A frequency spectrum (e.g., range of frequencies) that the transceiver 212 uses to generate the radar signals can encompass frequencies between one and four hundred gigahertz (GHz), between four and one hundred GHz, or between approximately seventy and eighty GHz. The transceiver 212 can employ a spread spectrum technique, such as code-division multiple access (CDMA), to support MIMO operations.

The radar system 102 also includes one or more processors 214 and computer-readable storage media (CRM) 216. The CRM 216 includes a low-level data generator 218 and an object classification module 220. The low-level data generator 218 and the object classification module 220 can be implemented using hardware, software, firmware, or a combination thereof. In this example, the processor 214 implements the low-level data generator 218 and the object classification module 220. Together, the low-level data generator 218 and the object classification module 220 enable the processor 214 to process responses from the receive antenna elements in the antenna array 210 to detect the object 108 and generate the radar data for the vehicle-based subsystem 202.

The low-level data generator 218 transforms raw data provided by the transceiver 212 into low-level data, which can be processed by the object classification module 220. The object classification module 220 analyzes the low-level data to determine an object class associated with the object 108. An operation of the object classification module 220 is further described with respect to FIG. 5.

The object classification module 220 produces the radar data for the vehicle-based subsystem 202. The radar data can include a number that indicates an object class associated with the object 108 and/or a number that represents a characteristic of the object 108 (e.g., position, speed, or direction of motion).

Figure 3:
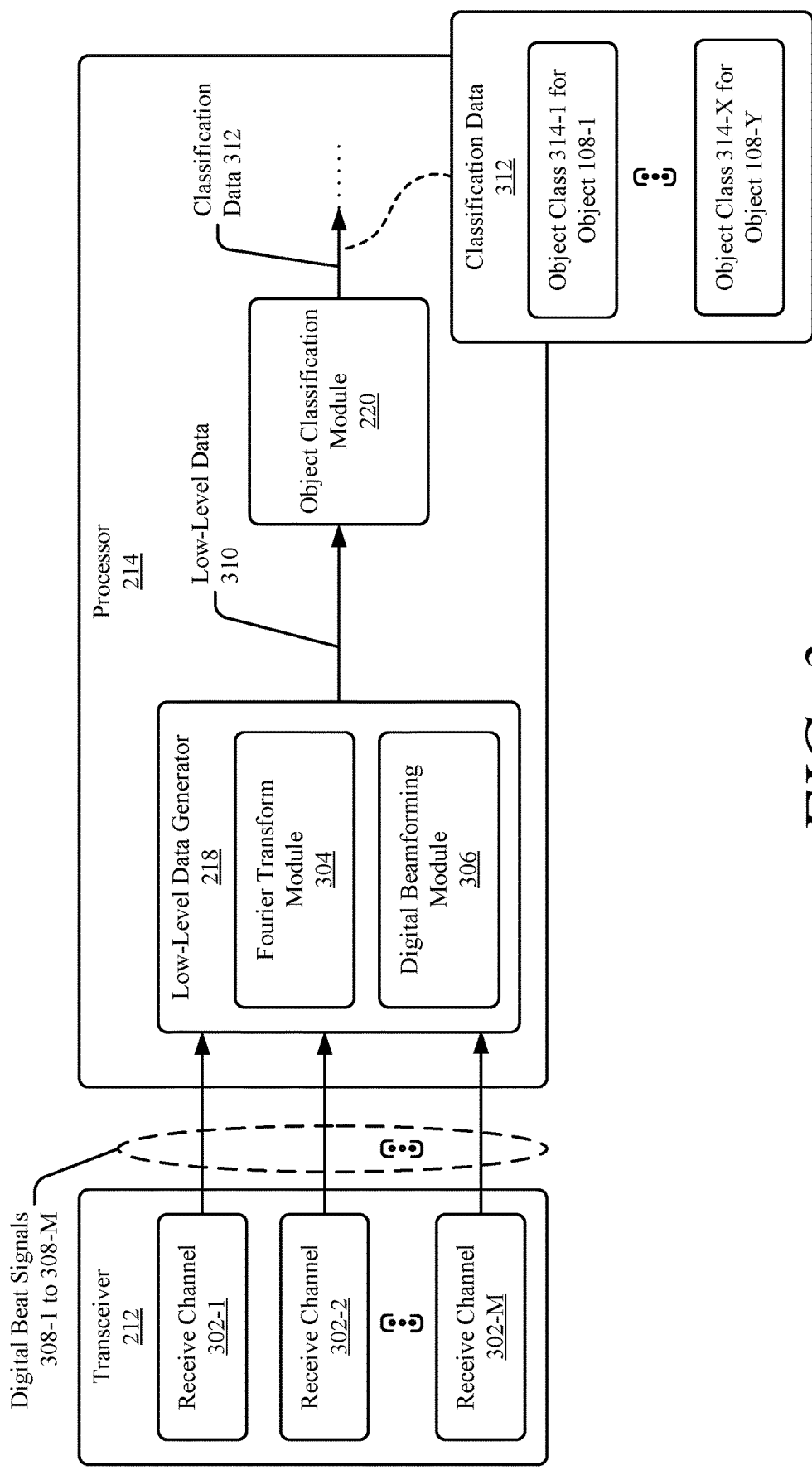
FIG. 3 illustrates example implementations of a transceiver and a processor of a radar system for performing object classification using low-level data.

FIG. 3 illustrates example implementations of the transceiver 212 and the processor 214 for performing object classification using low-level data. In the depicted configuration, the transceiver 212 includes multiple receive channels 302-1, 302-2 . . . 302-M, where M represents a positive integer. The processor is connected to the receive channels 302-1 to 302-M and implements the low-level data generator 218 and the object classification module 220.

The low-level data generator 218 can include a Fourier transform module 304, which performs one or more Fourier transform operations, such as a Fast Fourier Transform (FFT) operation. Using the Fourier transform module 304, the low-level data generator 218 can generate a range-Doppler map, which includes complex numbers (e.g., in-phase and quadrature components) associated with different range bins and Doppler bins.

The low-level data generator 218 can optionally include a digital beamforming module 306. The digital beamforming module 306 can employ a classical beamforming algorithm, such as a Bartlett algorithm. Alternatively, the digital beamforming module 306 can employ a super-resolution or adaptive beamforming algorithm, such as an iterative adaptive approach (IAA), a minimum variance distortionless response (MVDR) beamforming algorithm (e.g., a CAPON beamforming algorithm), or a multiple signal classification (MUSIC) beamforming algorithm. Using the digital beamforming module 306, the low-level data generator 218 can generate an azimuth-elevation map, which includes complex numbers for different azimuth bins and elevation bins.

During reception, the low-level data generator 218 accepts digital beat signals 308-1 to 308-M from the receive channels 302-1 to 302-M. The digital beat signals 308-1 to 308-M include digital time-domain samples of a received radar signal. In general, the digital beat signals 308-1 to 308-M represent raw or unprocessed complex radar data. The low-level data generator 218 performs one or more operations to generate low-level data 310 based on the digital beat signals 308-1 to 308-M. As an example, the low-level data generator 218 can use the Fourier transform module 304 and/or the digital beamforming module 306 to generate the low-level data 310, which includes amplitude information for one or more sets of range bins, Doppler bins, azimuth bins, or elevation bins.

In some cases, the low-level data 310 includes a two-dimensional map, such as a range-Doppler map or a range-azimuth map. The range-Doppler map represents a distribution of received energy across range and Doppler dimensions, while the range-azimuth map represents a distribution of received energy across range and azimuth dimensions. In other cases, the low-level data 310 includes a three-dimensional map, such as a range-Doppler-azimuth map or a range-azimuth-elevation map. The range-Doppler-azimuth map represents a distribution of received energy across the range, range rate, and azimuth dimensions. The range-azimuth-elevation map represents a distribution of received energy across the range, azimuth, and elevation dimensions. Alternatively, the low-level data 310 can include a four-dimensional range-Doppler-azimuth-elevation map, which represents a distribution of received energy across the range, range rate, azimuth, and elevation dimensions.

The low-level data generator 218 can generate other types of maps not described above to represent the low-level data 310. These maps can include one-dimensional vectors representing a distribution of received energy across one of the range, range rate, azimuth, or elevation dimensions. having other combinations of the range, range rate, azimuth, and elevation dimensions. The low-level data 310 can also include other multi-dimensional maps having other combinations of dimensions not described above. Over time, the low-level data generator 218 generates low-level data 310 for respective frames of the radar receive signal. A frame can include one or more chirps or pulses of the radar receive signal.

The object classification module 220 accepts the low-level data 310 and analyzes the low-level data 310 to generate classification data 312. The classification data 312 includes a list of objects 108-1 to 108-Y and their associated object classes 314-1 to 314-X, where X and Y are positive integers that may or may not be equal to each other. Example types of object classes 314 include a four-wheel vehicle class, a two-wheel vehicle class, and a living object class. The low-level data is further described with respect to FIG. 4.

Figure 4:
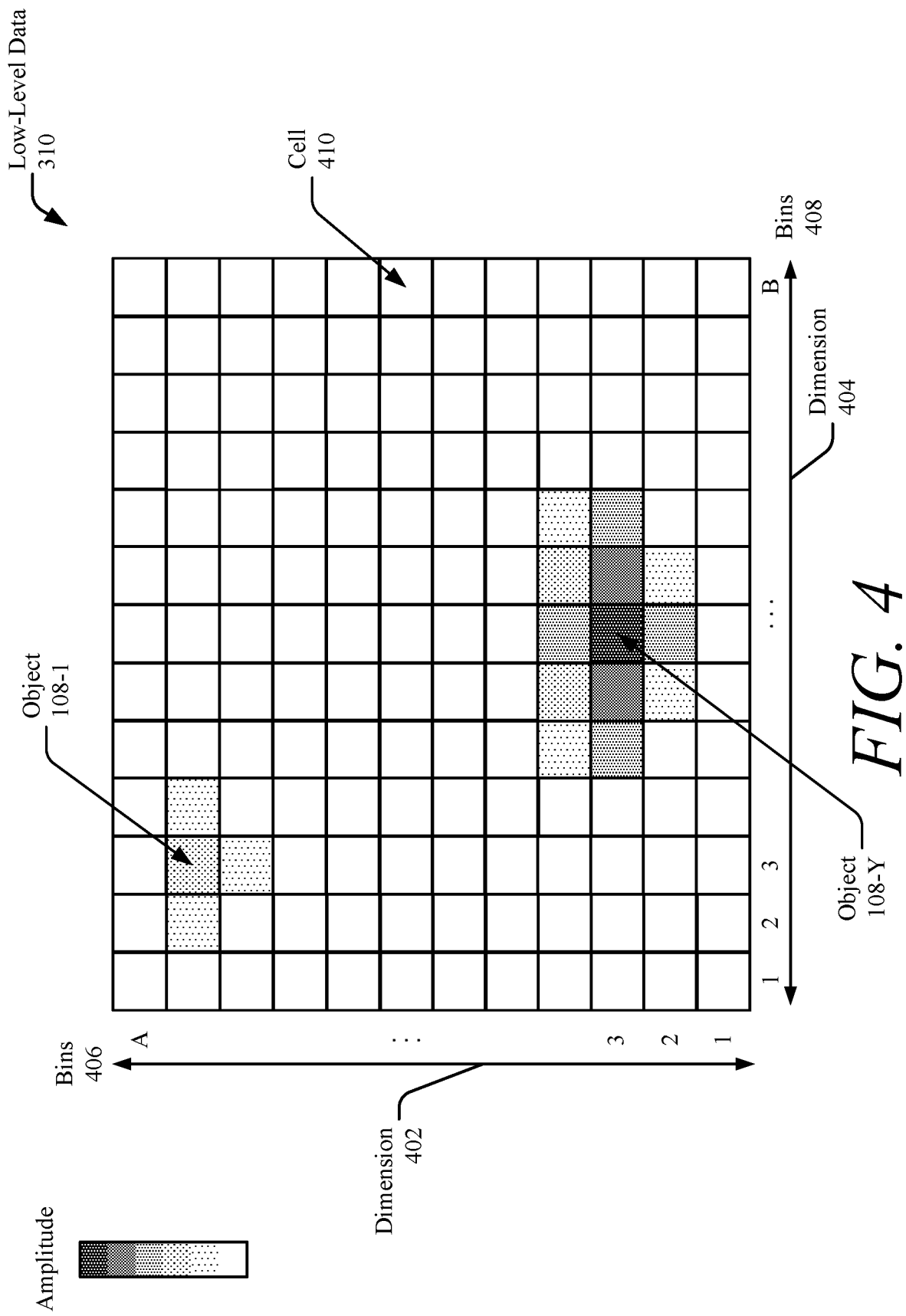
FIG. 4 illustrates example low-level data for object classification.

FIG. 4 illustrates example low-level data 310 for object classification. In this example, the amplitude (or magnitude) information of the low-level data 310 is illustrated with different patterns. Larger amplitudes are represented with patterns that have a larger percentage of black. Smaller amplitudes are represented with patterns that have a smaller percentage of black (e.g., a higher percentage of white). Although not shown, the low-level data 310 can also include phase information.

In this example, the low-level data 310 includes amplitude information for two dimensions 402 and 404. As described above, these dimensions 402 and 404 can be associated with range, range rate, azimuth, or elevation. Each dimension 402 and 404 is associated with a set of bins, which divides the associated dimension into intervals. Along the dimension 402, the amplitude information is distributed across bins 406-1 to 406-A, where A represents a positive integer. Along the dimension 404, the amplitude information is distributed across bins 408-1 to 408-B, where B represents a positive integer that may or may not be equal to A. Depending on associated dimension 402 and 404, the bins 406 and 408 can be range bins, Doppler bins, azimuth bins, or elevation bins. Each amplitude value (or complex number) is represented by a cell 410, which is associated with a particular bin 406 and a particular bin 408

Within the low-level data 310, objects 108 can have different distributions of energy associated with their object class. Consider an example in which the low-level data 310 includes reflected energy from the object 108-1 and the object 108-Y. In this example, the object 108-1 is the car 110-1 of FIG. 1, and the object 108-Y is the human 114-1 of FIG. 1. Additionally, the low-level data 310 represents a range-Doppler map in which the dimension 402 is a range dimension, the bins 406 are range bins, the dimension 404 is a Doppler (or range rate) dimension, and the bins 408 are Doppler bins. In this case, the reflected energy associated with the object 108-Y has a larger distribution across the dimension 404 than the reflected energy associated with the object 108-1. This can occur because different body parts of the human 114-1 can be observed to move at different rates whereas parts of the car 110-1 may not. The cell 410 with the largest amplitude can represent the range rate of the main body or torso of the human 114-1 while other cells 410 can represent other range rates associated with the arms or legs of the human 114-1, which can move differently while the human 114-1 walks. A variety of different features can be extracted from the low-level data 310 in order to classify the objects 108-1 and 108-Y, as further described with respect to FIG. 5.

Figure 5:
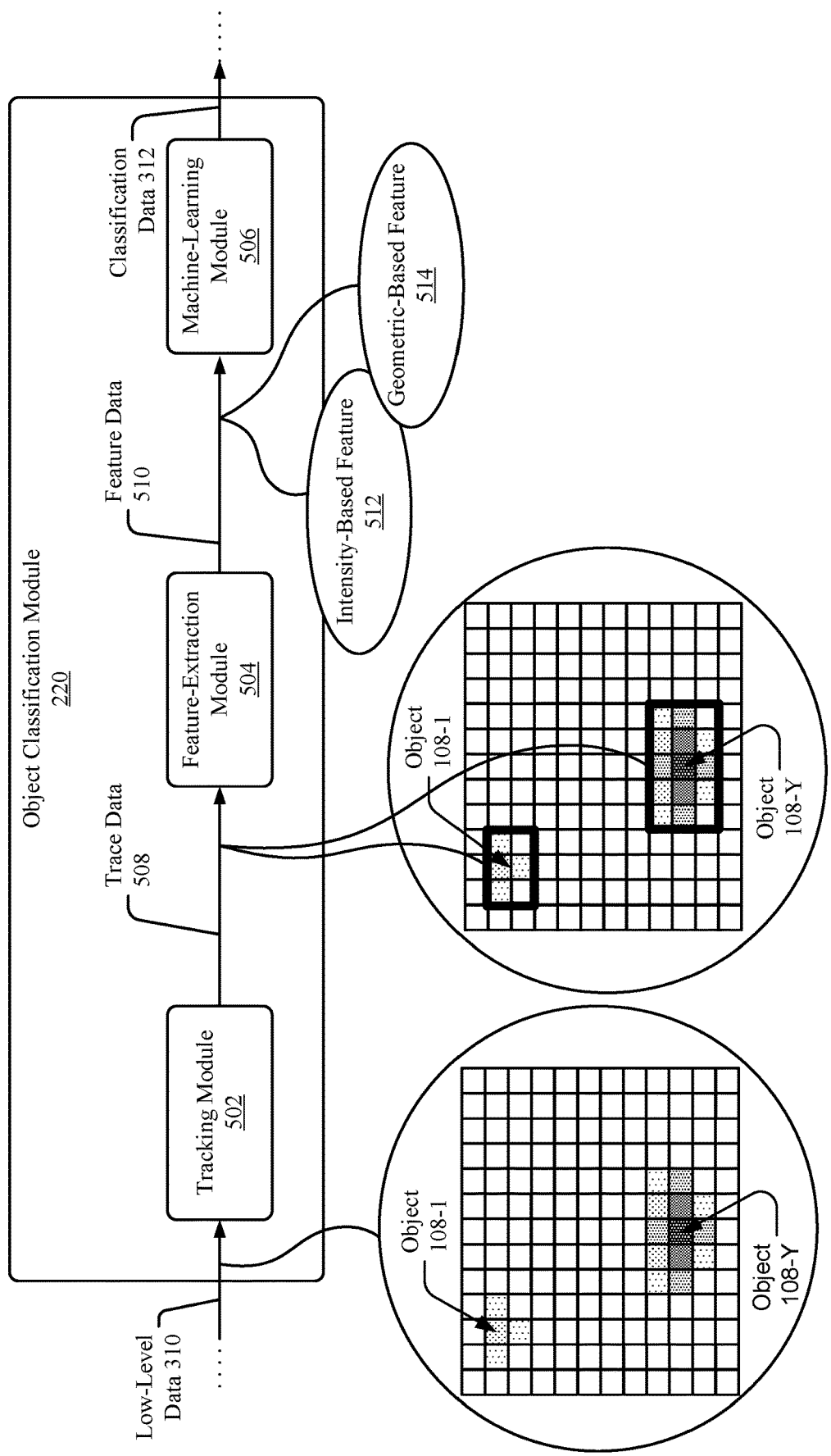
FIG. 5 illustrates an example scheme implemented by an object classification module for performing object classification using low-level data.

FIG. 5 illustrates an example scheme implemented by the object classification module 220 for performing object classification using low-level data 310. In the depicted configuration, the object classification module 220 implements a tracking module 502, a feature-extraction module 504, and a machine-learning module 506. In general, the tracking module 502 detects objects 108 within the low-level data 310. The feature-extraction module 504 identifies features associated with the detected objects 108. The machine-learning module 506 determines the object classes 314 associated with the detected objects 108 based on the identified features. Operations of the tracking module 502, the feature-extraction module 504, and the machine-learning module 506 are further described below.

During operation, the tracking module 502 accepts the low-level data 310 from the low-level data generator 218 (of FIG. 3). To detect the one or more objects 108 within the low-level data 310, the tracking module 502 can use filtering and detection techniques to separate reflected energy associated with an object-of-interest from reflected energy associated with noise or clutter.

As an example, the tracking module 502 filters (e.g., removes) amplitude information associated with stationary Doppler bins from the low-level data 310 to detect moving objects 108. Alternatively, the tracking module 502 filters amplitude information associated with moving Doppler bins from the low-level data 310 to detect stationary objects 108. The tracking module 502 can dynamically determine the stationary or moving Doppler bins based on a current speed of the vehicle 104. The tracking module 502 can also apply other filters, such as range filters, azimuth filters, or elevation filters, to downsize the low-level data 310 to a region of interest (e.g., a particular set of ranges, azimuth angles, or elevation angles).

The tracking module 502 can use various types of detection logic, such as blob detection or intensity-threshold windowing, to detect the objects 108. The blob detection detects objects 108 within the low-level data 310 by identifying adjacent cells 410 that have amplitudes greater than amplitudes of surrounding neighboring cells 410. The blob detection can use a threshold to determine if the difference in amplitude between the adjacent cells 410 and the neighboring cells 410 is sufficient to indicate a presence of an object 108. In contrast, the intensity-threshold windowing detects objects 108 within the low-level data 310 by identifying cells 410 that have amplitudes that are greater than or equal to a detection threshold. Both thresholds used by the blob detection and the intensity-threshold windowing can be predetermined based on an estimated noise level of the radar system 102 or dynamically adjusted based on the amount of noise observed within the low-level data 310 for the current frame. In comparison, the intensity-threshold windowing can be less complex to implement than the blob detection. However, the blob detection can operate with a lower threshold, which enables the tracking module 502 to detect objects 108 with weaker reflections, such as those associated with smaller objects 108 or objects 108 at farther ranges.

The tracking module 502 generates trace data 508 based on the low-level data 310. The trace data 508 includes a portion of the low-level data 310 information for each object 108 detected by the tracking module 502. In other words, the trace data 508 includes amplitude information for one or more cells 410 that are associated with an object 108, which is referred to as a trace. The trace can have similar dimensions as the low-level data 310. For example, the trace can include cells 410 across the four dimensions of the range-Doppler-azimuth-elevation map. The quantity of cells 410 across each dimension of the trace can be similar or different.

In some implementations, the traces for different objects 108 can have a same quantity of cells 410. In this case, the tracking module 502 can center a window around a cell 410 with the highest amplitude and provide the cells 410 within the window as the trace for that object 108. In other implementations, the traces for different objects 108 can have different quantities of cells 410 based on differences in the distribution of the object 108 across one or more dimensions of the low-level data 310. By tailoring the size of the trace for each object 108, the tracking module 502 can reduce the probability of the trace including other cells 410 that are not associated with the object 108 (e.g., other cells that are associated with noise or another object). In contrast to other types of radar systems that use detection-level data for classification, the trace data 508 can include amplitudes that are less than the detection threshold in order to provide additional information for classifying the object 108.

The feature-extraction module 504 extracts one or more features for each detected object 108 based on the trace data 508. The feature data 510 can include intensity-based features 512 or geometric-based features 514. Example types of intensity-based features 512 include an average amplitude across the cells 410 within the trace, a variation in the amplitude across the cells 410 within the trace, or a total energy across the cells 410 within the trace. Example types of geometric-based features 514 include a size of the trace across one or more dimensions, a shape of the trace across one or more dimensions, or an aspect ratio of the trace (e.g., length and width). The feature data 510 can be generated from low-level data 310 associated with a single frame (e.g., a single look or observation) or generated from low-level data 310 associated with multiple frames, as further described below.

In some implementations, the tracking module 502 and the feature-extraction module 504 rely on information from previous frames in order to generate the trace data 508 and the feature data 510, respectively. For example, the tracking module 502 can detect the object 108 within a current frame of low-level data 310 based on a detection of the object 108 within a previous frame of the low-level data 310. As an example, the tracking module 502 can apply a nearest-neighbor matching algorithm or a correlation-intensity algorithm across multiple frames of the low-level data 310 to associate an object in a current frame with an object in a previous frame. The tracking module 502 can also apply various tracking algorithms to predict a position of the object 108 within the current frame based on the information provided by the previous frame.

To reduce noise, the feature-extraction module 504 can apply a noise filter across the multiple traces of an object 108. For example, the feature-extraction module 504 can perform a weighted sum on the cells 410 of a current trace and a previous trace. To efficiently utilize memory and reduce the quantity of computations, the feature-extraction module 504 can determine a feature that represents a combination of previously-determined features.

The machine-learning module 506 accepts the feature data 510 from the feature-extraction module 504. Using machine-learning, the machine-learning module 506 analyzes the feature data 510 for each object and classifies the object according to one of the object classes 314-1 to 314-X. The machine-learning module 506 generates the classification data 312 (of FIG. 3), which lists the object class 314 for each detected object 108 for a current frame of the low-level data 310.

In some cases, the classification data 312 is provided to one or more of the vehicle-based subsystems 202 (of FIG. 2) to enable the vehicle-based subsystem 202 to make a decision based on the object classes 314, as described above with respect to FIGS. 1 and 2. In other cases, the classification data 312 is provided to the tracking module 502 or another independent tracker (not shown) of the radar system 102. Based on the classification data 312, the tracking module 502 or the tracker can adjust tracking parameters based on the object classes 314 of the objects 108. As such, the radar system 102 can dynamically adjust the tracking parameters to maintain visibility on the object 108, over time. The machine-learning module 506 is further described below with respect to FIG. 6.

Figure 6:
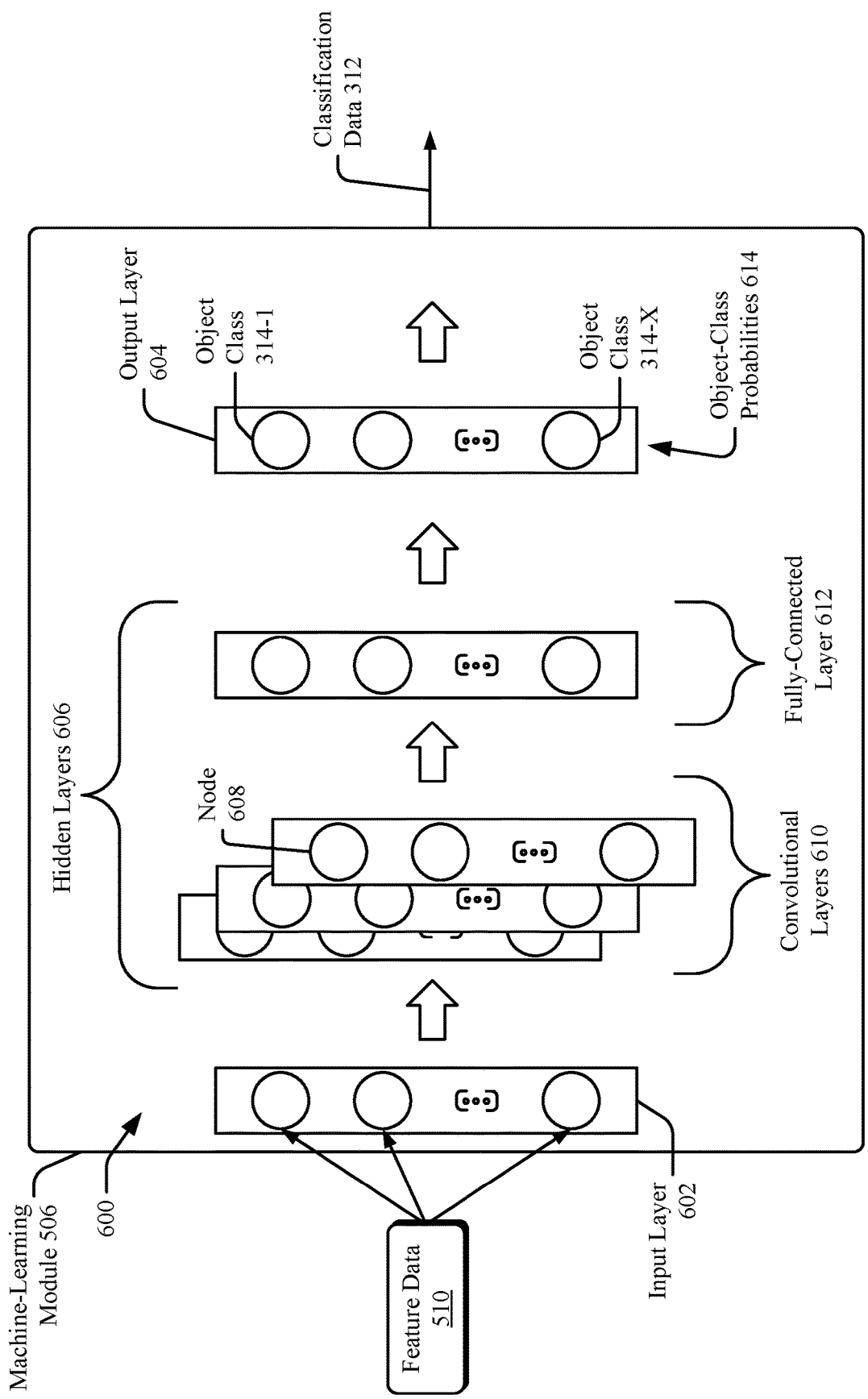
FIG. 6 illustrates an example implementation of a machine-learning module for performing object classification using low-level data.

FIG. 6 illustrates an example implementation of the machine-learning module 506. The machine-learning module 506 can include one or more artificial neural networks. A neural network includes a group of connected nodes (e.g., neurons or perceptrons), which are organized into one or more layers. In the depicted configuration, the machine-learning module 506 includes a deep neural network 600, which includes an input layer 602, an output layer 604, and one or more hidden layers 606 positioned between the input layer 602 and the output layer 604. Nodes 608 of the deep neural network 600 can be partially-connected or fully-connected between the layers.

The quantity of nodes 608 within the input layer 602 corresponds to the quantity of features that are extracted by the feature-extraction module 504 (of FIG. 5) for each object 108. Within the hidden layers 606, the quantity of nodes 608 can be similar or different for different hidden layers 606. The quantity of nodes 608 within the output layer is equal to the quantity of object classes 314 (e.g., X) that the object classification module 220 can identify.

In some implementations, the deep neural network 600 is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network 600 is a feed-forward deep neural network in which the connections between the nodes do not form a cycle. Additionally or alternatively, the machine-learning module 506 can include another type of neural network, such as a convolutional neural network.

Generally, a machine-learning architecture of the machine-learning module 506 can be tailored based on available power, available memory, or computational capability. The machine-learning architecture can also be tailored to implement a classification model that indicates whether or not an object 108 is associated with a particular object class 314 or a regression model that indicates probabilities associated with the object 108 being associated with different object classes 314.

In the depicted configuration, the machine-learning module 506 implements a trained regression model. The machine-learning module 506 includes convolutional layers 610 and one or more fully-connected layers 612 within the hidden layers 606. The convolutional layers 610 provide additional flexibility, which enables the machine-learning module 506 to operate with different quantities of features provided by the feature data 510.

During operation, the feature data 510 is provided to the input layer 602. The feature data 510 can include one or more intensity-based features 512, one or more geometric-based features 514, or a combination thereof. Each node 608 within the hidden layers 606 analyzes a different section or portion of the feature data 510 using an activation function. The node 608 activates (or inversely activates) when a specific type of characteristic is detected within the feature data 510.

At the output layer 604, the machine-learning module 506 generates object-class probabilities 614. The object-class probabilities 614 include continuous values that indicate probabilities of an object 108 being associated with the object classes 314-1 to 314-X. For example, the object-class probabilities 614 include a first probability that the object 108 is associated with the object class 314-1 and a second probability that the object 108 is associated with the object class 314-Z. The machine-learning module 506 classifies the object 108 according to the object class 314 associated with the highest probability. This information is provided as part of the classification data 312. The described operation can be performed multiple times for different feature data 510 associated with different objects 108 that are detected within the current frame of the low-level data 310.

With training, the machine-learning module 506 can determine the object class 314 by recognizing subtle patterns in the feature data 510. The machine-learning module 506 relies on supervised learning and can use measured (e.g., real) data for machine learning training purposes. In general, the real data (e.g., low-level data 310) is collected during situations in which the radar system 102 observes a particular type of object, such as any of the four-wheel vehicles 110, two-wheel vehicles 112, or living objects 114 of FIG. 1. By providing the real data along with the corresponding object class 314, the machine-learning module 506 can determine appropriate weights for classifying subsequent objects 108.

The machine-learning module 506 can also be continually trained using incremental sets of training data. After training the machine-learning module 506 to classify objects 108 according to a set of object classes 314, the machine-learning module 506 can execute another training operation using a new set of training data to classify objects 108 associated with a new object class 314. However, instead of starting with a random set of weights, the machine-learning module 506 executes the training operation using the previously-determined weights. In this way, the machine-learning module 506 can continually build upon and fine-tune its weights as new training data becomes available for new object classes 314.

Example Method

Figure 7:
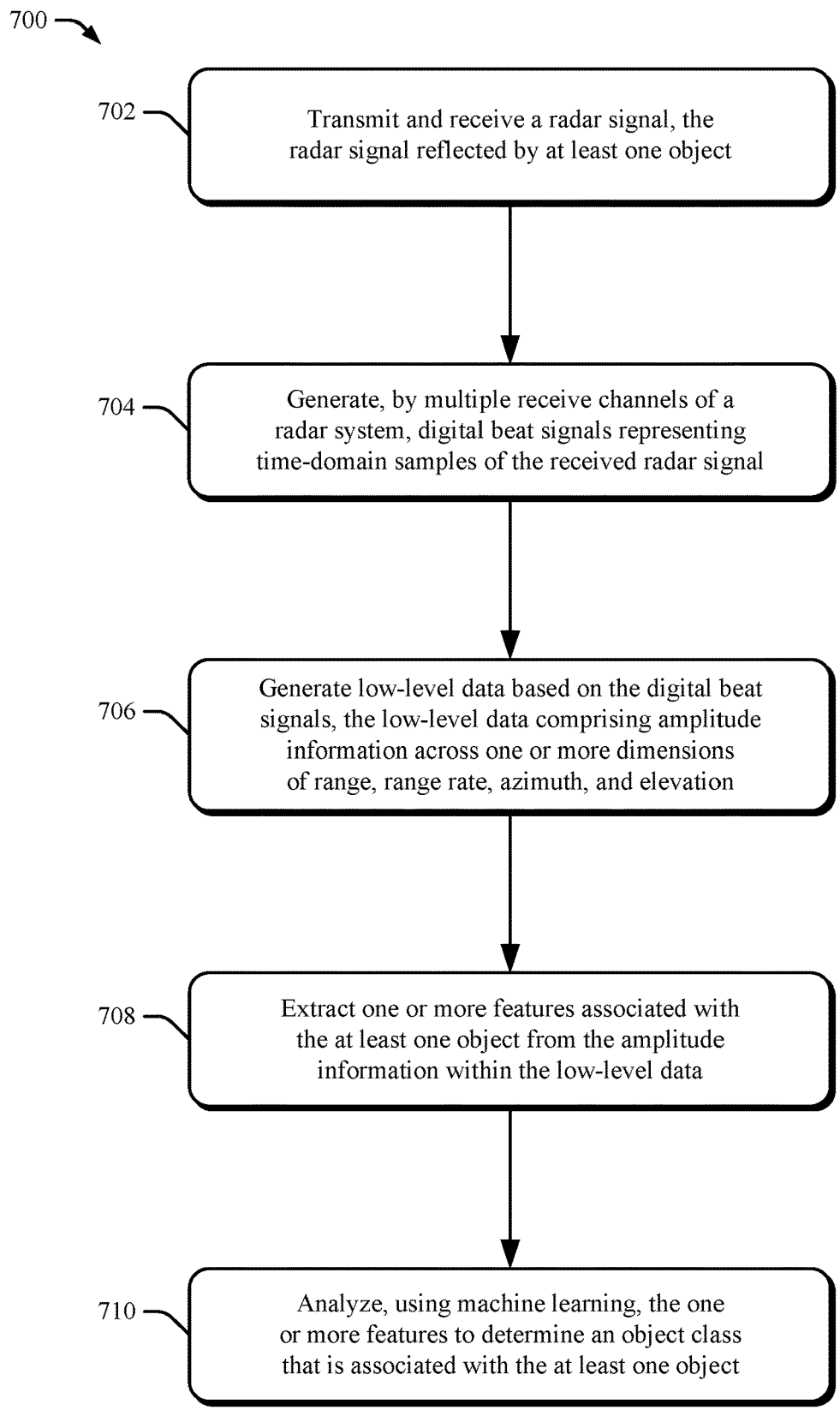
FIG. 7 illustrates an example method of a radar system for performing object classification using low-level data.

FIG. 7 depicts an example method 700 for performing object classification using low-level data. Method 700 is shown as sets of operations (or acts) performed but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 2, 3, and 5, reference to which is made for example only. The techniques are not limited to performance by one entity or multiple entities.

At 702, a radar signal is transmitted and received. The radar signal is reflected by at least one object. For example, the radar system 102 transmits and receives the radar signal, which is reflected by the object 108 of FIG. 1. Example types of objects 108 can include a four-wheel vehicle 110, a two-wheel vehicle 112, or a living object 114, as shown in FIG. 1.

At 704, digital beat signals are generated by multiple receive channels of a radar system. The digital beat signals represent time-domain samples of the received radar signal. For example, the receive channels 302-1 to 302-M generate the digital beat signals 308-1 to 308-M, as shown in FIG. 3. The digital beat signals 308-1 to 308-M represent time-domain samples of the received radar signal.

At 706, low-level data is generated based on the digital beat signals. The low-level data comprises amplitude information across one or more dimensions of range, range rate, azimuth, and elevation. For example, the low-level data generator 218 generates the low-level data 310 based on the digital beat signals 308-1 to 308-M, as shown in FIG. 3. The low-level data 310 comprises amplitude information across one or more dimensions of range, range rate, azimuth, and elevation, as shown in FIG. 4. As an example, the low-level data 310 can include a range-Doppler map, a range-azimuth map, or a range-Doppler-azimuth-elevation map. Other examples are described above with respect to FIG. 4.

At 708, one or more features associated with the at least one object are extracted from the amplitude information within the low-level data. For example, the feature-extraction module 504 of FIG. 5 extracts features associated with the object 108 based on the amplitude information within the low-level data 310. These features are included within the feature data 510 of FIG. 5, and can include intensity-based features 512, geometric-based features 514, or a combination thereof. Example features are described above with respect to FIG. 5.

At 710, the one or more features are analyzed using machine learning to determine an object class that is associated with the at least one object. For example, the machine-learning module 506 analyzes the feature data 510 to determine an object class 314 associated with the object 108, as described above with respect to FIG. 6. The machine-learning module 506 can be implemented using a neural network 700 and trained using supervised learning. In general, the use of machine learning represents the execution of a machine-learned model.

Some examples are described below.

Example 1: A method performed by a radar system that is mounted to a moving platform, the method comprising:
transmitting and receiving a radar signal, the radar signal reflected by at least one object;
generating, by multiple receive channels of the radar system, digital beat signals representing time-domain samples of the received radar signal;
generating low-level data based on the digital beat signals, the low-level data comprising amplitude information across one or more dimensions of range, range rate, azimuth, and elevation;
extracting one or more features associated with the at least one object from the amplitude information within the low-level data; and
analyzing, using machine learning, the one or more features to determine an object class that is associated with the at least one object.

Example 2: The method of example 1, further comprising: adjusting, based on the object class, parameters of a tracking system of the radar system to enable the tracking system to maintain track on the at least one object.

Example 3: The method of example 1, further comprising providing the object class to a subsystem of the moving platform to enable the moving platform to avoid a potential collision with the at least one object.

Example 4: The method of example 1, wherein the low-level data is associated with a range-rate dimension, the method further comprising:
prior to extracting the one or more features, filtering the low-level data to pass a portion of the low-level data that is associated with moving Doppler bins; and
detecting the at least one object based on the portion of the low-level data.

Example 5: The method of example 4, wherein:
the portion of the low-level data comprises multiple cells having respective amplitudes;
the detecting of the at least one object comprises:
identifying adjacent cells of the multiple cells with amplitudes that are greater than amplitudes of neighboring cells of the multiple cells, a difference between the amplitudes of the adjacent cells and the amplitudes of the neighboring cells being greater than a particular threshold; or
identifying one or more cells of the multiple cells with amplitudes that are greater than or equal to a detection threshold;
generating trace data to include the adjacent cells or the one or more cells; and
the extracting the one or more features comprises extracting the one or more features from the trace data.

Example 6: The method of example 4, further comprising: tracking the at least one object across multiple frames of the low-level data,
wherein the detecting of the at least one object comprises detecting the at least one object in a current frame of the multiple frames based on a detection of the at least one object in a previous frame of the multiple frames.

Example 7: The method of example 6, further comprising:
generating a first trace of the at least one object based on the low-level data associated with the previous frame, the first trace comprising first cells having respective first amplitudes;
generating a second trace of the at least one object based on the low-level data associated with the current frame, the second trace comprising second cells having respective second amplitudes; and
combining the first trace and the second trace to extract the one or more features associated with the at least one object.

Example 8: The method of example 1, wherein the one or more features comprise one or more of the following:
an average amplitude across a portion of the one or more dimensions of the low-level data;
a variation in amplitude across the portion of the one or more dimensions of the low-level data;
total energy across the portion of the one or more dimensions of the low-level data;
a size of the at least one object across the one or more dimensions of the low-level data;
a shape of the at least one object across the one or more dimensions of the low-level data; or
an aspect ratio of the at least one object.

Example 9: The method of example 1, wherein the low-level data comprises:
a range-Doppler map;
a range-azimuth map;
a range-Doppler-azimuth map; or
a range-Doppler-azimuth-elevation map.

Example 10: The method of example 1, wherein the object class comprises a four-wheel vehicle class, a two-wheel vehicle class, or a living object class.

Example 11: The method of example 1, wherein the amplitude information within the low-level data includes one or more amplitudes that are less than a detection-level threshold.

Example 12: The method of example 1, wherein the analyzing using machine learning comprises executing a machine-learned model trained to determine the object class that is associated with the at least one object.

Example 13: A radar system comprising:
at least one antenna array;
a transceiver coupled to the at least one antenna array, the transceiver configured to:
  transmit and receive a radar signal using the antenna array, the radar signal reflected by at least one object; and
  generate, by multiple receive channels of the transceiver, digital beat signals representing time-domain samples of the received radar signal; and
a processor coupled to the transceiver, the processor configured to:
  generate low-level data based on the digital beat signals, the low-level data comprising amplitude information across one or more dimensions of range, range rate, azimuth, and elevation;
  extract one or more features associated with the at least one object from the amplitude information within the low-level data; and
  analyze, using machine learning, the one or more features to determine an object class that is associated with the at least one object.

Example 14: The radar system of example 13, wherein the object class comprises a four-wheel vehicle class, a two-wheel vehicle class, or a living object class.

Example 15: The radar system of example 13, wherein the one or more features comprise one or more of the following:
  an average amplitude across a portion of the one or more dimensions of the low-level data;
  a variation in amplitude across the portion of the one or more dimensions of the low-level data;
  total energy across the portion of the one or more dimensions of the low-level data;
  a size of the at least one object across the one or more dimensions of the low-level data;
  a shape of the at least one object across the one or more dimensions of the low-level data; or
  an aspect ratio of the at least one object.

Example 16: A computer-readable storage media comprising computer-executable instructions that, responsive to execution by a processor, implement:
  an object detection module configured to:
  accept low-level data comprising amplitude information across one or more dimensions of range, range rate, azimuth, and elevation, the amplitude information including a distribution of reflected energy associated with at least one object;
  extract one or more features associated with the at least one object from the amplitude information within the low-level data; and
  analyze, using machine learning, the one or more features to determine an object class that is associated with the at least one object.

Example 17: The computer-readable storage media of example 16, wherein:
  the low-level data is associated with a range-rate dimension; and
  the object detection module is configured to:
  prior to extracting the one or more features, filter the low-level data to pass a portion of the low-level data that is associated with moving Doppler bins; and
  detect the at least one object based on the portion of the low-level data.

Example 18: The computer-readable storage media of example 17, wherein:
  the portion of the low-level data comprises multiple cells having respective amplitudes; and
  the object detection module is configured to:
  selectively:
    identify adjacent cells of the multiple cells with amplitudes that are greater than amplitudes of neighboring cells of the multiple cells, a difference between the amplitudes of the adjacent cells and the amplitudes of the neighboring cells being greater than a particular threshold; or
    identify one or more cells of the multiple cells with amplitudes that are greater than or equal to a detection threshold;
  generate trace data to include the adjacent cells or the one or more cells; and extract the one or more features from the trace data.

Example 19: The computer-readable storage media of example 17, wherein the object detection module is configured to:
  track the at least one object across multiple frames of the low-level data; and
  detect the at least one object in a current frame of the multiple frames based on a detection of the at least one object in a previous frame of the multiple frames.

Example 20: The computer-readable storage media of example 19, wherein the object detection module is configured to:
  generate a first trace of the at least one object based on the low-level data associated with the previous frame, the first trace comprising first cells having respective first amplitudes;
  generate a second trace of the at least one object based on the low-level data associated with the current frame, the second trace comprising second cells having respective second amplitudes; and
  combine the first trace and the second trace to extract the one or more features associated with the at least one object.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The invention claimed is:

1. A method performed by a radar system that is mounted to a moving platform, the method comprising:
  transmitting and receiving a radar signal, the radar signal reflected by at least one object;
  generating, by multiple receive channels of the radar system, digital beat signals representing time-domain samples of the received radar signal;
  generating low-level data based on the digital beat signals, the low-level data comprising amplitude information across a range-rate dimension and one or more dimensions of range, azimuth, and elevation;
  filtering the low-level data to pass a portion of the low-level data that is associated with moving Doppler bins, the portion of the low-level data including multiple cells having respective amplitudes;

detecting the at least one object based on the portion of the low-level data by identifying adjacent cells of the multiple cells with amplitudes that are greater than amplitudes of neighboring cells of the multiple cells, a difference between the amplitudes of the adjacent cells and the amplitudes of the neighboring cells being greater than a particular threshold;

generating trace data to include the adjacent cells or the one or more cells;

extracting, from the trace data, one or more features associated with the at least one object from the amplitude information within the low-level data; and analyzing, using a machine-learning module, the one or more features to determine an object class that is associated with the at least one object, the machine-learning module including multiple nodes in one or more hidden layers between an input layer and an output layer, each of the multiple nodes in the one or more hidden layers configured to analyze a different portion of the one or more features using an activation function, the object class associated with the at least one object being based on which nodes of the multiple nodes are activated.

2. The method of claim 1, further comprising:
adjusting, based on the object class, parameters of a tracking system of the radar system to enable the tracking system to maintain a respective track on the at least one object.

3. The method of claim 1, further comprising providing the object class to a subsystem of the moving platform to enable the moving platform to avoid a potential collision with the at least one object.

4. The method of claim 1, further comprising:
tracking the at least one object across multiple frames of the low-level data,
wherein the detecting of the at least one object comprises detecting the at least one object in a current frame of the multiple frames based on a detection of the at least one object in a previous frame of the multiple frames.

5. The method of claim 4, further comprising:
generating a first trace of the at least one object based on the low-level data associated with the previous frame, the first trace comprising first cells having respective first amplitudes;
generating a second trace of the at least one object based on the low-level data associated with the current frame, the second trace comprising second cells having respective second amplitudes; and
combining the first trace and the second trace to extract the one or more features associated with the at least one object.

6. The method of claim 1, wherein the one or more features comprise one or more of the following:
an average amplitude across a portion of the one or more dimensions of the low-level data;
a variation in amplitude across the portion of the one or more dimensions of the low-level data;
total energy across the portion of the one or more dimensions of the low-level data;
a size of the at least one object across the one or more dimensions of the low-level data;
a shape of the at least one object across the one or more dimensions of the low-level data; or
an aspect ratio of the at least one object.

7. The method of claim 1, wherein the low-level data comprises:

a range-Doppler map;
a Doppler-azimuth map;
a range-Doppler-azimuth map; or
a range-Doppler-azimuth-elevation map.

8. The method of claim 1, wherein the object class comprises a four-wheel vehicle class, a two-wheel vehicle class, or a living object class.

9. The method of claim 1, wherein the amplitude information within the low-level data includes one or more amplitudes that are less than a detection-level threshold.

10. The method of claim 1, wherein the analyzing using machine learning comprises generating object-class probabilities that indicate probabilities of the at least one object being associated with a particular object class of one or more object classes.

11. A radar system comprising:
at least one antenna array;
a transceiver coupled to the at least one antenna array, the transceiver configured to:
transmit and receive a radar signal using the antenna array, the radar signal reflected by at least one object; and
generate, by multiple receive channels of the transceiver, digital beat signals representing time-domain samples of the received radar signal; and
a processor coupled to the transceiver, the processor configured to:
generate low-level data based on the digital beat signals, the low-level data comprising amplitude information across a range-rate dimension and one or more dimensions of range, azimuth, and elevation;
filter the low-level data to pass a portion of the low-level data that is associated with moving Doppler bins, the portion of the low-level data including multiple cells having respective amplitudes;
detect the at least one object based on the portion of the low-level data by identifying adjacent cells of the multiple cells with amplitudes that are greater than amplitudes of neighboring cells of the multiple cells, a difference between the amplitudes of the adjacent cells and the amplitudes of the neighboring cells being greater than a particular threshold;
generate trace data to include the adjacent cells or the one or more cells;
extract, from the trace data, one or more features associated with the at least one object from the amplitude information within the low-level data; and
analyze, using a machine-learning module, the one or more features to determine an object class that is associated with the at least one object, the machine-learning module including multiple nodes in one or more hidden layers between an input layer and an output layer, each of the multiple nodes in the one or more hidden layers configured to analyze a different portion of the one or more features using an activation function, the object class associated with the at least one object being based on which nodes of the multiple nodes are activated.

12. The radar system of claim 11, wherein the object class comprises a four-wheel vehicle class, a two-wheel vehicle class, or a living object class.

13. The radar system of claim 11, wherein the one or more features comprise one or more of the following:
an average amplitude across a portion of the one or more dimensions of the low-level data;
a variation in amplitude across the portion of the one or more dimensions of the low-level data;

total energy across the portion of the one or more dimensions of the low-level data;
a size of the at least one object across the one or more dimensions of the low-level data;
a shape of the at least one object across the one or more dimensions of the low-level data; or
an aspect ratio of the at least one object.

14. A non-transitory computer-readable storage media comprising computer-executable instructions that, responsive to execution by a processor of a radar system, implement:
an object detection module configured to:
accept low-level data comprising amplitude information across a range-rate dimension and one or more dimensions of range, azimuth, and elevation, the amplitude information including a distribution of reflected energy associated with at least one object;
filter the low-level data to pass a portion of the low-level data that is associated with moving Doppler bins, the portion of the low-level data including multiple cells having respective amplitudes;
detect the at least one object based on the portion of the low-level data by identifying adjacent cells of the multiple cells with amplitudes that are greater than amplitudes of neighboring cells of the multiple cells, a difference between the amplitudes of the adjacent cells and the amplitudes of the neighboring cells being greater than a particular threshold;
generate trace data to include the adjacent cells or the one or more cells;
extract, from the trace data, one or more features associated with the at least one object from the amplitude information within the low-level data;
analyze, using a machine-learning module machine learning, the one or more features to determine an object class that is associated with the at least one object, the machine-learning module including multiple nodes in one or more hidden layers between an input layer and an output layer, each of the multiple nodes in the one or more hidden layers configured to analyze a different portion of the one or more features using an activation function, the object class associated with the at least one object being based on which nodes of the multiple nodes are activated; and
provide the object class associated with the at least one object to a vehicle-based subsystem; and
the vehicle-based subsystem configured to control operation of a host vehicle based on the object class associated with the at least one object.

15. The non-transitory computer-readable storage media of claim 14, wherein the object detection module is further configured to:
track the at least one object across multiple frames of the low-level data; and
detect the at least one object in a current frame of the multiple frames based on a detection of the at least one object in a previous frame of the multiple frames.

16. The non-transitory computer-readable storage media of claim 15, wherein the object detection module is further configured to:
generate a first trace of the at least one object based on the low-level data associated with the previous frame, the first trace comprising first cells having respective first amplitudes;
generate a second trace of the at least one object based on the low-level data associated with the current frame, the second trace comprising second cells having respective second amplitudes; and
combine the first trace and the second trace to extract the one or more features associated with the at least one object.

17. The non-transitory computer-readable storage media of claim 14, wherein the object detection module is further configured to:
adjust, based on the object class, parameters of a tracking system coupled to the processor to enable the tracking system to maintain a respective track on the at least one object.

18. The non-transitory computer-readable storage media of claim 14, wherein the one or more features comprise one or more of the following:
an average amplitude across a portion of the one or more dimensions of the low-level data;
a variation in amplitude across the portion of the one or more dimensions of the low-level data;
total energy across the portion of the one or more dimensions of the low-level data;
a size of the at least one object across the one or more dimensions of the low-level data;
a shape of the at least one object across the one or more dimensions of the low-level data; or
an aspect ratio of the at least one object.

19. The non-transitory computer-readable storage media of claim 14, wherein the object class comprises a four-wheel vehicle class, a two-wheel vehicle class, or a living object class.

20. The non-transitory computer-readable storage media of claim 14, wherein the object detection module is further configured to generate object-class probabilities that indicate probabilities of the at least one object being associated with a particular object class.

* * * * *